US012445012B2

(12) United States Patent
Naaijkens et al.

(10) Patent No.: US 12,445,012 B2
(45) Date of Patent: Oct. 14, 2025

(54) MICROGENERATOR PROVIDED WITH A CLUTCH SYSTEM, STAND-ALONE ELECTRIC DEVICE PROVIDED WITH AN INTEGRATED MICROGENERATOR

(71) Applicant: KINETRON B.V., Tilburg (NL)

(72) Inventors: Roel Naaijkens, Tilburg (NL); Frans Vromans, Tilburg (NL); Wesley Peijnenburg, Tilburg (NL); Maarten Adrianus Hubertus Hoedjes, Tilburg (NL); Tim Van Stuijvenberg, Tilburg (NL); Sultan Tahyrovich Jumayev, Tilburg (NL)

(73) Assignee: KINETRON B.V., Tilburg (NL)

( * ) Notice: Subject to any disclaimer, the term of this patent is extended or adjusted under 35 U.S.C. 154(b) by 200 days.

(21) Appl. No.: 18/560,298

(22) PCT Filed: May 12, 2022

(86) PCT No.: PCT/NL2022/050260
§ 371 (c)(1),
(2) Date: Nov. 10, 2023

(87) PCT Pub. No.: WO2022/240291
PCT Pub. Date: Nov. 17, 2022

(65) Prior Publication Data

US 2024/0243636 A1 Jul. 18, 2024

(30) Foreign Application Priority Data

May 12, 2021 (NL) ...................................... 2028195

(51) Int. Cl.
*H02K 7/12* (2006.01)
*H02K 7/116* (2006.01)
*H02K 99/00* (2014.01)

(52) U.S. Cl.
CPC ............... *H02K 7/12* (2013.01); *H02K 7/116* (2013.01); *H02K 99/10* (2016.11); *H02K 2213/03* (2013.01)

(58) Field of Classification Search
CPC .......... H02K 7/12; H02K 7/116; H02K 99/10; H02K 2213/03; H02K 7/10; H02K 7/1853; F16H 19/04; F16D 41/067
See application file for complete search history.

(56) References Cited

U.S. PATENT DOCUMENTS 3,187,869 A 6/1965 Spencer
7,160,351 B2 * 1/2007 Trasorras ................ B22F 3/164 75/246
2011/0012459 A1 * 1/2011 Chang .................. H02K 7/1853 290/1 A

FOREIGN PATENT DOCUMENTS

JP S5656144 A 5/1981
KR 20140105063 A * 9/2014 .............. H02K 7/08
(Continued)

OTHER PUBLICATIONS

KR-20140105063-A_translate (Year: 2014).*
WO-2014061944-A1_translate (Year: 2014).*

*Primary Examiner* — Oluseye Iwarere
*Assistant Examiner* — Mohammed Ahmed Qureshi
(74) *Attorney, Agent, or Firm* — The Webb Law Firm

(57) ABSTRACT

Provided is a microgenerator of a flat design including a base plate having an external side and an internal side; a stator which is a circular multipole metal stator coil for producing an electric voltage, which stator is fixedly positioned on the internal side of the base plate; a rotor wheel including a circular multipole magnetic array, which rotor wheel is rotatably positioned on the internal side of the base plate; and an actuating system for rotating the rotor wheel. The actuating system includes an input mechanism provided at
(Continued)

an external side of the base plate which input mechanism is preferably movable in two directions, and a rotatable rotor shaft which has a concentric orientation to the rotor wheel. The rotor shaft is drivingly engaged with the input mechanism either in a direct or indirect manner. A first side of the rotor shaft is provided with a rotor gear wheel that is in driving engagement with the input mechanism either in a direct or indirect manner, and a second side of the rotor shaft is drivingly connected to the rotor wheel. The actuating system is provided with at least one clutch system to establish a unidirectional driving engagement of the actuating system with the rotor wheel.

15 Claims, 4 Drawing Sheets

(56) References Cited

FOREIGN PATENT DOCUMENTS

| | | | | |
|---|---|---|---|---|
| KR | 1020140105063 | A | 9/2014 | |
| WO | WO-2014061944 | A1 * | 4/2014 | ............... H02K 1/12 |

* cited by examiner

MICROGENERATOR PROVIDED WITH A CLUTCH SYSTEM, STAND-ALONE ELECTRIC DEVICE PROVIDED WITH AN INTEGRATED MICROGENERATOR

CROSS-REFERENCE TO RELATED APPLICATIONS

This application is the United States national phase of International Application No. PCT/NL2022/050260 filed May 12, 2022, and claims priority to The Netherlands Patent Application No. 2028195 filed May 12, 2021, the disclosures of which are hereby incorporated by reference in their entireties.

BACKGROUND OF THE INVENTION

Field of the Invention

The present invention relates to a microgenerator provided with a clutch system, and a stand-alone electric device provided with such a microgenerator.

Description of Related Art

According to its first aspect, the invention relates to a microgenerator comprising:

- a base body;
- a stator which is a circular multipole metal stator coil for producing an electric voltage, which stator is fixedly positioned on the base body;
- a rotor wheel comprising a circular multipole magnetic array, which rotor wheel is rotatably positioned on the base body;
- an actuating system for rotating the rotor wheel, which actuating system comprises:
  - an input mechanism provided on the base body which input mechanism is movable in two directions, and
  - a rotatable rotor shaft which has a concentric orientation to the rotor wheel, the rotor shaft being drivingly engaged with the input mechanism either in a direct or indirect manner, wherein a first side of the rotor shaft is provided with a rotor gear wheel that is in driving engagement with the input mechanism either in a direct or indirect manner, and a second side of the rotor shaft is drivingly connected to the rotor wheel.

Such microgenerators for generating electrical energy have become popular over the last decades. Recent developments in the field encompass new applications for stand-alone electric devices which are of relatively small size, such as for instance wearables such as wireless sensors, remote controls, trackers or watches, and non-wearables such as door-locks, cylindrical locks and wireless sensors or controls.

In such a microgenerator, the input mechanism can be subjected to an external force which is provided by a human force or a moving weight, which sets the input mechanism in motion. This movement is transmitted via the actuating system into a rotation of the rotor, wherein the kinetic energy of the rotor is transformed into electrical energy that is generated in the stator of the microgenerator.

In the context of the present invention, it is desired that the microgenerator can be used in applications wherein the kinetic energy introduced to the actuating system by an external force is based on a single movement, i.e. over a single trajectory and in a single direction, such as when inserting a key in a corresponding lock, when opening a door over a hinged mechanism, or in trespassing a mechanical sensor.

A drawback in such situations, is that the kinetic energy of the single movement is inherently limited and therefore the efficiency of harvesting kinetic energy by the microgenerator requires an optimum configuration of the actuating system in order to generate a sufficient electric voltage for the intended purposes.

At the same time, it is required that the size of the microgenerator remains relatively small so that it is still suitable to be integrated in the respective devices that are considered.

Furthermore, the microgenerator should be easy to manufacture and its design should allow for an expedient integration in a suitable electric device.

SUMMARY OF THE INVENTION

The objective of the invention is therefore to develop a microgenerator which satisfactorily complies with the above requirements, and thus is suitable for the indicated purposes wherein kinetic energy is generated by a single movement.

According to a first aspect of the invention the above objective is met, by providing a microgenerator of the above described type, wherein:

- the actuating system is provided with at least one clutch system to establish a unidirectional driving engagement of the actuating system with the rotor wheel, wherein the clutch system is configured such that:
  - a) when the input mechanism is moved in a first direction, the clutch system adopts a driving engagement status and the rotor wheel is rotated, and
  - b) when the input mechanism is moved in a second direction or is in a stationary position, the clutch system adopts an idle status and no driving engagement is established between the input mechanism and the rotor wheel,
- wherein the clutch system is designed in such a way that the clutch system comprises an assembly of:
  - a rotatable shaft which is part of the actuating system, which shaft has an outer cylindrical surface which is provided with a radially undulated profile so that the radius of the outer cylindrical surface varies between a minimum radius r1 and a maximum radius r2,
  - a rotatable cylindrical engagement wall which is fixedly connected to a rotatable part that is to be driven by the shaft, which cylindrical engagement wall has a concentric orientation to the shaft and an substantially constant inner radius r3 that is larger than r2, and surrounds the shaft in a non-contacting manner,
  - a rotatable and annular clutch body positioned concentrically between the outer cylindrical surface of the shaft and the cylindrical engagement wall, which clutch body is in its rotational direction slidably arranged with respect to both the shaft and the cylindrical engagement wall,
  - wherein the annular clutch body has a cylindrical form comprising at least one slot segment delimited by at least one wall segment, and preferably comprising at least four segments which include at least two wall segments and at least two slot segments such that each slot segment is delimited by two wall segments,
  - wherein in each slot segment a clutch ball is present which clutch ball is freely movable within the respective slot segment such that at least a part of the clutch ball is kept within the respective slot segment, wherein each clutch ball has a diameter d1 which is larger than the difference between r2 and r3 and smaller than the difference between r1 and r3, and the radial thickness of the wall segments is smaller than the difference between r2 and r3, wherein the clutch system is designed to establish a unidirectional driving engagement of the shaft with the cylindrical engagement wall, such that:

a) when the shaft is rotated in a first rotational direction, the clutch system adopts a driving engagement status such that the cylindrical engagement wall is driven by the shaft, and b) when the shaft is rotated in a second rotational direction, the clutch system adopts an idle status wherein no driving engagement is established between the shaft and the cylindrical engagement wall, wherein the clutch body allows for a freedom of radial movement of each clutch ball within the respective slot segment, such that each clutch ball is moved to an active position when the shaft is rotated in the first rotational direction, and each clutch ball is moved to an idle position when the shaft is rotated in a second rotational direction.

It is noted that in regard of the input mechanism being movable in a first and a second direction, the second direction is typically the reverse of the first direction.

The actuating system herein achieves that the rotor wheel can only be driven in one rotational direction, and not in the opposite rotational direction.

It is especially advantageous to use such a clutch system in the microgenerator of the invention, when the kinetic energy is to be harvested from a single movement. When the single movement has been executed and the movement of the input mechanism in a first direction has been completed, the driving shaft reaches a stationary position wherein the clutch system allows for the spinning of the rotor wheel by its own inertia to be prolonged beyond the actual execution of the driving movement. Furthermore, the input mechanism of the microgenerator can subsequently be returned to its initial position without affecting the rotational energy of the rotor wheel and vice versa. As such, the transformation of energy by the microgenerator is significantly raised and hence the efficiency of the microgenerator is improved in particular in the context of harvesting energy from a single movement.

The generated electrical energy may be used for different purposes, and is typically used to power one or more electronic components connected to said microgenerator. Examples of such electronic components are a light, rectifying and charging components, a control unit (processor), a capacitor, a rechargeable battery, a communication unit, an input signal producing unit, and an output signal producing units. One or more of said electronic components or further electrical energy demanding components typically make part of a device, preferably a portable device, to which the microgenerator is connected and/or which comprises said microgenerator. The application of (output) signal producing units is e.g. favourable in case the microgenerator makes part of and/or is connected to a device being (i) a remote control configured to transmit one or more signals, and/or (ii) a sensor configured to transmit one or more signals, and/or (iii) a key configured to send a signal (and energy) to a (cylindrical) lock, preferably a paired lock and/or adjacent lock in order to lock or unlock said lock, and/or (iv) a (cylindrical) lock configured to send a signal to a key, in particular a paired key and/or adjacent key in order to lock or unlock said lock. In case the device comprises an energy storage such as a capacitor or rechargeable battery, the generated electrical energy can be used and/or stored in said energy storage.

In regard of the required compact and flat design of the microgenerator, such a clutch system is furthermore practically advantageous to integrate in the microgenerator.

It is advantageous in the microgenerator of the invention, when the base body is a base plate having an internal and external side, wherein the rotor wheel and stator are preferably provided on the internal side and/or the input mechanism is preferably provided on the external side. Optionally, the base body, in particular the base plate, is at least partially integrally connected with the stator.

In such a microgenerator, the base plate forms a barrier layer between the external side and the internal side, such that the rotor wheel and the stator of the microgenerator can be shielded off from the ambient atmosphere when the microgenerator is integrated in a device. For that reason, the base plate is advantageously provided with sealing material at appropriate locations in order to enhance the shielding effect of the base plate, for instance to render a watertight barrier.

It is preferable in the microgenerator according to the invention, that the rotor shaft is drivingly engaged with the input mechanism in an indirect manner by virtue of at least one rotatable driving shaft that is included in the actuating system and positioned between the input mechanism and the rotor shaft, wherein a first side of the driving shaft is drivingly connected in a direct or indirect manner to the input mechanism, and a second side of the driving shaft is provided with a driving gear wheel that has a concentric orientation to the driving shaft, which driving gear wheel is drivingly engaged with the rotor gear wheel in a direct or indirect manner, wherein preferably the clutch system is integrated in the driving shaft, such that the clutch system in driving engagement status establishes a driving engagement between the driving shaft and the driving gear wheel, while in idle status no driving engagement is established between the driving shaft and the driving gear wheel.

Such an actuating system includes a transmission over at least two gears in order to reach an optimum transmission ratio between the movement of the input mechanism and the resulting rotation of the rotor wheel.

Furthermore, when the clutch system is integrated in the driving shaft this will be additionally beneficial with respect to the efficiency and/or required dimensions of the microgenerator.

According to another preferred embodiment of the microgenerator, the clutch system is integrated in the rotor shaft, such that the clutch system in driving engagement status establishes a driving engagement between the rotor shaft and the rotor wheel, while in idle status no driving engagement is established between the rotor shaft and the rotor wheel, and preferably the clutch system is arranged in a same plane wherein the stator and the rotor wheel are arranged.

Dependent on the specific application of the microgenerator such a positioning of the clutch system is advantageous in view of the efficiency and/or the required dimensions of the microgenerator.

Typically, in the microgenerator according to the invention, the stator and the rotor wheel are concentrically positioned on the internal side of the base body, in such a way that the diameter of the rotor wheel is larger than the diameter of the stator, so that the rotor wheel surrounds the stator; or the diameter of the stator is larger than the diameter of the rotor wheel, so that the stator surrounds the rotor wheel.

Such a configuration of the stator and rotor wheel is advantageous in view of the efficiency and/or the required dimensions of the microgenerator.

It is particularly attractive in the microgenerator according to the invention, when the input mechanism for the driving shaft comprises a rotatable wheel such as a gear wheel that is drivingly engaging with the rotor shaft in a direct or indirect manner, and preferably the input mechanism comprises a co-operating assembly of a gear wheel and a linear movable gear, wherein the linear movable gear rotates the gear wheel which is drivingly engaging with the rotor shaft in a direct or indirect manner.

Furthermore it is preferable that the microgenerator according to the invention is provided with a counter-actuator which drives the input mechanism into a default position of the input mechanism, preferably the counter-actuator being a spring, such as a linear compression spring or a torsion spring.

The microgenerator as such secures that the input mechanism is automatically set in its default position after being moved by an external force, so that kinetic energy can immediately be harvested during a next occasion wherein the input mechanism is subjected to an external force.

When the counter-actuator is applied in the microgenerator, it is preferably positioned such that it engages directly or indirectly with a part of the actuating system, such as the input mechanism, the driving shaft, or the rotor shaft.

In the microgenerator according to the invention, it is attractive when the actuating system is provided with a kinetic energy absorbing means which absorbs, up to a threshold value, kinetic energy that is introduced into the actuating system via the input mechanism, and which kinetic energy absorbing means releases the absorbed kinetic energy to the actuating system for rotation of the rotor wheel when the threshold value is exceeded.

For instance, the energy absorbing means is provided as an integrated feature within either the driving shaft or the rotor shaft, wherein the energy absorbing means has a first and a second end which are fixedly connected to a first side and a second side of the respective shaft.

The kinetic energy absorbing means may be a mainspring that can be wound up into a tighter coiled configuration for absorbing energy, and can be unwounded later on for release of energy. By virtue of the kinetic energy absorbing means, the kinetic energy that is released in order to rotate the rotor wheel, becomes less dependent of the actual speed by which the input mechanism is moved during use.

The threshold value of the energy absorbing means, may for instance be the amount of kinetic energy that is required to rotate the rotor wheel against the intrinsic cogging torque of the stator-rotor assembly.

It is preferred in the microgenerator according to the invention, that the rotor wheel is rotated by the input mechanism, when the input mechanism is subjected to an external force that moves the input mechanism from a predetermined default position towards a next position along a single trajectory.

This specific movement of the input mechanism along the single trajectory thus delivers the kinetic energy that rotates the rotor wheel for producing electrical power, which makes the microgenerator most suitable for the intended purposes.

Preferably in the microgenerator of the invention, the stator and rotor wheel form an assembly which has a maximum outer diameter of about 10.0-40.0 mm, preferably 10.0-30.0 mm. It is further preferred that the overall thickness of the microgenerator is about 2.0 mm-20.0 mm, preferably 2.0-10.0 mm.

The above preferred dimensions are most suitable for the intended applications of the microgenerator.

The microgenerator is designed to create an average power during operation in the range of 10 mW to 10 W, preferably 10 mW to 1 Watt and more preferably 10 mW to 500 mW.

The energy harvested per operation of the microgenerator (i.e. per rotation angle or per linear stroke) is typically 0.1 mJ to 1 J, preferably 0.1 mJ to 250 mj and more preferably 0.1 mJ to 100 mJ.

When the kinetic energy is harvested from a rotational movement, the microgenerator is designed to harvest an input from 10 revolutions or less, preferably 5 revolutions or less, and most preferably 1 revolution or only a part of a single revolution.

When the kinetic energy is harvested from a linear movement, the microgenerator is designed to harvest an input from linear strokes of 0.25 mm to 50 mm, preferably 0.25 mm to 25 mm and more preferably 0.25 mm to 10 mm.

In regard of the clutch system that is included in the microgenerator, various configurations of the clutch system itself are advantageous that are described below in detail.

In the microgenerator of the invention, it is preferred that the clutch body has an outer circumference formed by the radial outside surfaces of the wall segments which outer circumference has an outer radius which is smaller than r3, and an opposed inner circumference formed by the radial inside surfaces of the wall segments which inner circumference has an inner radius which is larger than r2, wherein the radial difference between the outer radius and r3 is smaller than the radial difference between the inner radius and r2, preferably smaller by at least 0.05 mm, and more preferably smaller by 0.1 mm up to 0.5 mm, and most preferably by at least 1.0. mm.

The radial difference between the outer radius and r3 itself may be in the range of 0.05 mm up to 0.5 mm.

Consequently a radial gap exists between the outer diameter of the wall segments and the engagement wall, which is smaller than the radial gap between the inner diameter of the wall segments and the maximum radius r2 of the outer surface of the shaft. This specific dimensioning assures that no friction is possible between the inner diameter of the clutch body with the shaft, while a small amount of friction is allowed between the outer diameter of the clutch body with the engagement wall.

This difference in the radial gap at the inner and outer diameter of the clutch body with respect to the shaft resp. the engagement wall contributes to an expedient functioning of the clutch body in establishing an engagement status as well as in establishing an idle status, such that a change between both statuses is achieved in a quick, smooth and reliable manner.

A suitable radial gap between the outer diameter of the clutch body and the engagement wall, is for instance 0.1 mm to 0.5 mm. The radial gap between the inner diameter and maximum radius r2 of the outer surface of the shaft is preferably at least 1.0 mm.

The clutch system according to the invention has been found particularly attractive to be integrated in a microgenerator that is designed for applications wherein the kinetic energy introduced to the actuating system of the microgenerator by an external force is based on a single movement (i.e. over a single trajectory and in a single direction).

Different than clutch systems known from the prior art, the invention does not require any type of spring-loaded connection system which engages the shaft with the engagement wall. Furthermore, the invention proposes a clutch system which allows for a reliable, quick and smooth shifting between an engagement status and an idle status, while no spring-loaded connection systems are used.

In this context, the clutch system is attractive because it allows for providing an efficient microgenerator which complies with the required dimensions of the microgenerator. The clutch system is such that it achieves a highly effective transmission of kinetic energy in engagement status and virtually no transmission of kinetic energy when in idle status, and therefore contributes substantially to the efficiency of the microgenerator. At the same time the clutch system as a whole is of a compact design which allows for integration in relatively small spaces that are available within a microgenerator. Especially the clutch body that is part of the clutch system, is based on a compact and efficient design which is advantageous for the clutch system as a whole.

For the microgenerator according to the invention, the following attractive configurations of the clutch system are applicable:

- the rotatable shaft may be a rotor shaft, an intermediate shaft, or a driving shaft of a microgenerator;
- the rotatable part may be a rotor wheel, an intermediate gear, or a driving gear wheel of a driving shaft;
- the annular clutch body typically comprises an additional circular base structure onto which the wall segments are fixedly connected, such as a flattened ring;
- the clutch body is in its rotational direction slidably arranged with respect to both the shaft and the cylindrical engagement wall which allows for a rotational freedom of the clutch body with respect to both the shaft and the cylindrical engagement wall.

The clutch system in the context of the invention includes also a mechanically reversed configuration of the rotatable shaft and the cylindrical engagement wall, such that the shaft surrounds the cylindrical engagement wall and the clutch body is present between the shaft and the cylindrical engagement wall.

It is noted that when the clutch system is integrated in the actuating system of a microgenerator, each slot segment additionally is delimited in a vertical direction by a bottom structure and a ceiling structure. The bottom structure and ceiling structure as such delimit the vertical space wherein the clutch ball is freely movable within the slot segment. The bottom structure may be an additional integral part of the clutch body in the form of a flattened ring; the ceiling structure may be an additional circular top structure fixedly connected to the cylindrical engagement wall also in the form of a flattened ring. Both the bottom and ceiling structure are dimensioned and arranged in such a way that the slidable arrangement clutch body between the shaft and the engagement wall is maintained and not compromised by the structures.

It is preferable in the microgenerator according to the invention, when the clutch system is configured such that:

a) when the shaft is rotated in the first rotational direction, each clutch ball is forced towards the active position wherein the clutch ball is clamped in an abutting contact between the outer cylindrical surface of the shaft and the cylindrical engagement wall, such that the clutch ball establishes a driving engagement between the shaft and the cylindrical engagement wall, b) when the shaft is rotated in the second rotational direction, each clutch ball is forced towards an idle position wherein the clutch ball is not clamped in an abutting contact between the outer cylindrical surface of the shaft and the cylindrical engagement wall.

In an alternative embodiment of the clutch system, the clutch balls are replaced by clutch rods which are present in the respective slot segments. The clutch rods have the same functionality as the clutch balls, and are equally movable between an idle position and an active position as defined for the clutch balls. Each clutch rod has a cylindrical surface with a diameter equal to d1 of the clutch ball, and a cylindrical length smaller than the vertical space of the respective slot segment. Furthermore, the clutch rods are positioned in the slot segments such that their cylindrical axis is oriented in a direction which is substantially vertical. Due to the chosen relative dimensions of the clutch rods and the slot segments, the substantially vertical orientation of the clutch rods is maintained while the clutch system is operated.

It is further preferable in the microgenerator according to the invention, when the clutch system is configured such that the difference between the minimum radius r1 and the maximum radius r2 of the outer cylindrical surface, has a value relative to d1 which lies in the range of 0.25*d1 up to 0.75*d1, preferably in the range of 0.25*d1 up to 0.50−*d1.

Such relative dimensions were found most suitable for accomplishing the advantageous properties of the clutch system.

It is also preferable in the microgenerator according to the invention, when the clutch system is configured such that the width of the slot segment that is delimited by two respective wall segments is larger than d1 up to 100% larger, and is preferably in the range of 5% to 50% larger than d1.

Such widths were found suitable for allowing a free movement of the clutch ball within the slot segment, while securing that a change from the idle status towards the engagement status is quickly adopted.

Equally, the vertical height of the slot segment when it is delimited by a bottom part and a ceiling part, is larger than d1, and preferably in the range of 10% to 50% larger than d1.

In the microgenerator according to the invention, it is preferred when the clutch system is configured such that the number of wall segments and the number of slot segments is 2, 3, 4, 5, or more and preferably each of the wall segments extend over an identical wall arc and each of the slot segments extend over an identical slot arc.

The number of slot segments necessarily includes an equal number of clutch balls being used in the clutch system, which is attractive for achieving a satisfactory driving engagement by virtue of the clutch balls while being in active position between the shaft and the cylindrical engagement wall.

Furthermore, it is preferred in the microgenerator according to the invention, when the clutch system is configured such that the radially undulated profile of the outer cylindrical surface of the shaft, is composed of a number of adjacent undulation segments, wherein each undulation segment is defined as a segment of the cylindrical surface that stretches from one maximum radius r2 to an adjacent maximum radius r2' and includes one minimum radius r1 in between, wherein preferably each of the undulation segments extends over an identical undulation arc.

In particular it is preferred that the number of adjacent undulation segments is 2, 3, 4, 5 or more, and is equal to the number of slot segments of the clutch body.

Preferably in the microgenerator according to the invention, the clutch system is configured such that each undulation segment has an asymmetrical undulation profile between the maximum radius r2 and the adjacent maximum radius r2', preferably such that each undulation segment comprises a first undulation profile stretching from the maximum radius r2 to the minimum radius r1 and a second undulation profile stretching from the minimum radius r1 to the adjacent maximum radius r2', wherein the slopes of the first and second undulation profiles are different in regard of their maximum sloping angle with respect to the radial direction of the shaft, preferably having a difference in maximum sloping angle of at least 15 degrees, more preferably at least 45 degrees.

Consequently, each undulation segment includes one undulation profile having a maximum sloping angle that is substantially larger than for the other.

The asymmetrical undulation profile is preferred in order to secure a unidirectional driving engagement, wherein the first undulation profile is involved in moving the clutch ball towards an active position and retaining that position, whereas the second undulation profile is involved in moving the clutch ball towards an idle position and retaining that position.

A particularly effective configuration in this context includes that the first undulated profile comprises a maximum sloping angle with respect to the radial direction of the shaft, which is 120 degrees or less, preferably 105 degrees or less, while the second undulated profile comprises a maximum sloping angle with respect to the radial direction of the shaft, which is at least 135 or more, preferably 150 degrees or more.

For clarity it is noted that the sloping angle of the undulated profile is herein defined as the angle that is enclosed by the tangent line of the undulation profile at a chosen position, and the radial line r connecting the shaft's centre to the chosen position. The minimum value of the sloping angle of the undulated profile in this context is 90 degrees, which corresponds to a situation wherein the sloping angle of the undulated profile is perpendicular to the radius of the shaft. When the sloping angle is larger than 90 degrees, the number of degrees expresses the extent by which the sloping angle is directed radially away from the shaft's centre. The sloping angle has a maximum value of 180 degrees, which corresponds to a situation wherein the sloping angle of the undulation profile coincides with the radial direction of the shaft. The sloping angle in this context is thus defined as a value irrespective of whether the tangent line of the respective slope is directed clockwise or anti-clockwise.

In the microgenerator according to the invention, the clutch system is configured such that the undulated profile of each undulation segment may comprise curved and/or angled parts.

In a further preferred embodiment of the microgenerator according to the invention, the clutch system is configured such that the second undulation profile comprises a curved profile, preferably a circular profile, more preferably a circular profile of a radius r which expressed in diameter d1 of the clutch ball, lies in the range of 0.40*d1 up to 0.60*d1.

Such a curved and preferably circular profile is attractive for securing that the clutch ball is retained in an idle position because the curved profile is compatible to the outer circumference of the clutch ball. This is even more effective when the circular profile has a radius r that is approximately half of the diameter of the clutch ball.

Preferably in the microgenerator according to the invention, the clutch system is configured such that the wall segments have a maximum radial thickness which is smaller than 90%, preferably smaller than 80% of the difference between r2 and r3.

In the microgenerator according to the invention, the clutch system is preferably configured such that the inner radius r3 of the cylindrical engagement wall is in the range of 1.0 mm to 30 mm, preferably 1.0 mm to 10 mm, more preferably 1.0 mm to 5 mm.

In further preferred embodiments of the microgenerator according to the invention, the clutch system is configured in such a way that:

- the minimum radius r1 lies in the range of 0.25-20 mm, preferably 0.25-10 mm and more preferably 0.25-5.0 mm; and/or
- the maximum radius r2 lies in the range of 0.50-25 mm, preferably 0.50-10 mm and more preferably 0.50-5.0 mm.

In other preferred embodiments of the microgenerator according to the invention, the clutch system is configured in such a way that the diameter d1 of the clutch balls lies in the range of 0.25-7.5 mm, preferably 0.25-2.5 mm and more preferably 0.15-1.0 mm.

According to a second aspect, the invention relates to a stand-alone electric device that is provided with at least one integrated microgenerator according to one of the preceding claims, wherein an external driving element and/or further driving element is movably arranged on the electric device such that the external driving element is movable with respect to the microgenerator, and wherein the external driving element is drivingly connected to the input mechanism of the microgenerator.

The external element may be a stylus, a disc or gear etc. which are moved by a single movement when the stand-alone device is used.

The stand-alone electric device according to the second aspect of the invention may be a key and/or a (cylindrical) lock. Alternatively, the stand-alone electric device a hinge may be a hinge, a (mechanical) sensor or a remote control.

In case that the microgenerator is integrated in a key which comprises as two main constituting parts a key grip for handling the key and a key extension that interacts with a co-operating cylindrical lock, it is expedient to provide the external driving element on the key extension, and to integrate the microgenerator in the key grip. The external driving element may be a linear or rotary moving element.

In case that the microgenerator is integrated in a hinge the external driving element is preferably a rotary component such as a gear wheel.

In case that the microgenerator is integrated in a mechanical sensor or in a remote control, the external driving element is preferably a button, knob or wheel that is activated by a user either automatically (in a sensor) or by their own volition (in a remote control).

Further embodiments of the invention are illustrated in the non-limitative clause set presented below:

1. Microgenerator of a flat design comprising:

optionally a base body, such as a base plate which may have an external side and an internal side;

a stator which is a circular multipole metal stator coil for producing an electric voltage, which stator is preferably fixedly positioned to the (optional) base body, more preferably on the internal side of the (optional) base body, in particular base plate;

a rotor wheel comprising a circular multipole magnetic array, which rotor wheel is preferably rotatably positioned and/or mounted on the (optional) base body, more preferably on the internal side of the (optional) base body, in particular base plate;

an actuating system for rotating the rotor wheel;

wherein the actuating system preferably comprises:

an input mechanism preferably provided at the base body, more preferably at an external side of the base plate, which input mechanism is preferably movable in two directions, and a rotatable rotor shaft which has a concentric orientation to the rotor wheel, the rotor shaft being drivingly engaged with the input mechanism either in a direct or indirect manner, wherein the rotor shaft, preferably a first side of the rotor shaft, is provided with a rotor gear wheel that is in driving engagement with the input mechanism either in a direct or indirect manner, and the rotor shaft, preferably a second side of the rotor shaft, is drivingly connected to the rotor wheel, wherein the actuating system is provided with at least one clutch system to establish a unidirectional driving engagement of the actuating system with the rotor wheel, wherein the clutch system is preferably configured such that:

a) when the input mechanism is moved in a first direction, the clutch system adopts a driving engagement status and the rotor wheel is rotated, and b) when the input mechanism is moved in a second direction or is in a stationary position, the clutch system adopts an idle status and no driving engagement is established between the input mechanism and the rotor wheel, wherein the microgenerator is preferably configured to electrical power in between 2 mW and 1 W, more preferably in between 5 and 200 mW.

2. Microgenerator according to clause 1, wherein the rotor shaft is drivingly engaged with the input mechanism in an indirect manner by virtue of at least one rotatable driving shaft that is included in the actuating system and positioned between the input mechanism and the rotor shaft, wherein a first side of the driving shaft is drivingly connected in a direct or indirect manner to the input mechanism, and a second side of the driving shaft is provided with a driving gear wheel that has a concentric orientation to the driving shaft, which driving gear wheel is drivingly engaged with the rotor gear wheel in a direct or indirect manner, wherein preferably the clutch system is integrated in the driving shaft, such that the clutch system in driving engagement status establishes a driving engagement between the driving shaft and the driving gear wheel, while in idle status no driving engagement is established between the driving shaft and the driving gear wheel.

3. Microgenerator according to one of the preceding clauses, wherein the clutch system is integrated in the rotor shaft, such that the clutch system in driving engagement status establishes a driving engagement between the rotor shaft and the rotor wheel, while in idle status no driving engagement is established between the rotor shaft and the rotor wheel, and wherein preferably the clutch system is arranged in a same plane wherein the stator and the rotor wheel are arranged.

4. Microgenerator according to one of the preceding clauses, wherein the stator and the rotor wheel are concentrically positioned on the base body, preferably the internal side of the base plate, in such a way that the diameter of the rotor wheel is larger than the diameter of the stator, so that the rotor wheel surrounds the stator; or the diameter of the stator is larger than the diameter of the rotor wheel, so that the stator surrounds the rotor wheel.

5. Microgenerator according to one of the preceding clauses, wherein the input mechanism comprises a rotatable wheel such as a gear wheel that is drivingly engaging with the rotor shaft in a direct or indirect manner, and preferably the input mechanism comprises a co-operating assembly of a gear wheel and a linear movable gear, wherein the linear movable gear rotates the gear wheel which is drivingly engaging with the rotor shaft in a direct or indirect manner.

6. Microgenerator according to one of the preceding clauses, which is provided with a counter-actuator which drives the input mechanism into a predetermined default position of the input mechanism, preferably the counter-actuator being a spring, such as a linear compression spring or a torsion spring.

7. Microgenerator according to one of the preceding clauses, wherein the actuating system is provided with a kinetic energy absorbing means which absorbs, up to a threshold value, kinetic energy that is introduced into the actuating system via the input mechanism, and which kinetic energy absorbing means releases the absorbed kinetic energy to the actuating system for rotation of the rotor wheel when the threshold value is exceeded.

8. Microgenerator according to one of the preceding clauses, wherein the rotor wheel is rotated by the input mechanism when the input mechanism is subjected to an external force that moves the input mechanism from a predetermined default position towards a next position along a single trajectory.

9. Microgenerator according to one of the preceding clauses, wherein the stator and rotor wheel form an assembly which has a maximum outer diameter of about 10.0-40.0 mm, and wherein preferably the overall thickness of the microgenerator is about 2.0 mm-20.0 mm.

10. Clutch system suitable for use in an actuating system for rotating of a rotor wheel of a microgenerator, for instance a microgenerator according to one the clauses 1-9, which clutch system comprises an assembly of:

a rotatable shaft which is designed for use in the actuating system, which shaft has an outer cylindrical surface which is provided with a radially undulated profile so that the radius of the outer cylindrical surface varies between a minimum radius r1 and a maximum radius r2, a rotatable cylindrical engagement wall which is fixedly connected to a rotatable part that is to be driven by the shaft, which cylindrical engagement wall has a concentric orientation to the shaft and an substantially constant inner radius r3 that is larger than r2, and surrounds the shaft in a non-contacting manner, a rotatable and annular clutch body positioned concentrically between the outer cylindrical surface of the shaft and the cylindrical engagement wall, which clutch body is in its rotational direction slidably arranged with respect to both the shaft and the cylindrical engagement wall, wherein the annular clutch body has a cylindrical form comprising at least one slot segment delimited by at least one wall segment, and preferably comprising at least four segments which include at least two wall segments and at least two slot segments such that each slot segment is delimited by two wall segments, wherein in each slot segment a clutch ball is present which clutch ball is freely movable within the respective slot segment such that at least a part of the clutch ball is kept within the respective slot segment, wherein each clutch ball has a diameter d1 which is larger than the difference between r2 and r3 and smaller than the difference between r1 and r3, and the radial thickness of the wall segments is smaller than the difference between r2 and r3, wherein the clutch system is designed to establish a unidirectional driving engagement of the shaft with the cylindrical engagement wall, such that:

a) when the shaft is rotated in a first rotational direction, the clutch system adopts a driving engagement status such that the cylindrical engagement wall is driven by the shaft, and b) when the shaft is rotated in a second rotational direction, the clutch system adopts an idle status wherein no driving engagement is established between the shaft and the cylindrical engagement wall, wherein the clutch body allows for a freedom of radial movement of each clutch ball within the respective slot segment, such that each clutch ball is moved to an active position when the shaft is rotated in the first rotational direction, and each clutch ball is moved to an idle position when the shaft is rotated in a second rotational direction.

11. Clutch system according to clause 10, wherein the clutch body has an outer circumference formed by the radial outside surfaces of the wall segments which outer circumference has an outer radius which is smaller than r3, and an opposed inner circumference formed by the radial inside surfaces of the wall segments which inner circumference has an inner radius which is larger than r2, wherein the radial difference between the outer radius and r3 is smaller than the radial difference between the inner radius and r2, preferably smaller by at least 0.05 mm, and more preferably smaller by 0.1 mm up to 0.5 mm, and most preferably by at least 1.0. mm.

12. Clutch system according to clause 10 or 11, wherein:

a) when the shaft is rotated in the first rotational direction, each clutch ball is forced towards the active position wherein the clutch ball is clamped in an abutting contact between the outer cylindrical surface of the shaft and the cylindrical engagement wall, such that the clutch ball establishes a driving engagement between the shaft and the cylindrical engagement wall, b) when the shaft is rotated in the second rotational direction, each clutch ball is forced towards an idle position wherein the clutch ball is not clamped in an abutting contact between the outer cylindrical surface of the shaft and the cylindrical engagement wall.

13. Clutch system according to one of the preceding clauses 10-12, wherein the difference between the minimum radius r1 and the maximum radius r2 of the outer cylindrical surface, has a value relative to d1 which lies in the range of 0.25*d1 up to 0.75*d1, preferably in the range of 0.35*d1 up to 0.65*d1.

14. Clutch system according to one of the preceding clauses 10-13, wherein the width of the slot segment that is delimited by two respective wall segments is larger than d1 up to 100% larger, and preferably in the range of 10% to 50% larger than d1.

15. Clutch system according to one of the preceding clauses 10-14, wherein the number of wall segments and the number of slot segments is 2, 3, 4, 5, or more, and preferably each of the wall segments extend over an identical wall arc and each of the slot segments extend over an identical slot arc.

16. Clutch system according to one of the preceding clauses 10-15, wherein the radially undulated profile of the outer cylindrical surface of the shaft, is composed of a number of adjacent undulation segments, wherein each undulation segment is defined as a segment of the cylindrical surface that stretches from one maximum radius r2 to an adjacent maximum radius r2' and includes one minimum radius r1 in between, wherein preferably each of the undulation segments extends over an identical undulation arc.

17. Clutch system according to clause 16, wherein the number of adjacent undulation segments is 2, 3, 4, 5 or more, and is equal to the number of slot segments of the clutch body.

18. Clutch system according to clause 16 or 17, wherein each undulation segment has an asymmetrical undulation profile between the maximum radius r2 and the adjacent maximum radius r2', preferably such that each undulation segment comprises a first undulation profile stretching from the maximum radius r2 to the minimum radius r1 and a second undulation profile stretching from the minimum radius r1 to the adjacent maximum radius r2', wherein the slopes of the first and second undulation profiles are substantially different in regard of their maximum sloping angle with respect to the radial direction of the shaft, preferably the respective slopes having a difference in maximum sloping angle of at least 15 degrees, more preferably at least 45 degrees.

19. Clutch system according to clause 18, wherein the first undulated profile comprises a maximum sloping angle with respect to the radial direction of the shaft, which is 120 degrees or less, preferably 105 degrees or less, while the second undulated profile comprises a maximum sloping angle with respect to the radial direction of the shaft, which is at least 135 or more, preferably 150 degrees or more.

20. Clutch system according to one of the clauses 16-18, wherein the undulated profile of each undulation segment comprises curved and/or angled parts.

21. Clutch system according to one of the clauses 18-20, wherein the second undulation profile comprises a curved profile, preferably a circular profile, more preferably a circular profile of a radius r which expressed in diameter d1 of the clutch ball, lies in the range of 0.40*d1 up to 0.60*d1.

22. Clutch system according to one of the preceding clauses 10-21, wherein the wall segments have a maximum radial thickness which is smaller than 90%, preferably smaller than 80% of the difference between r2 and r3.

23. Clutch system according to one of the preceding clauses 10-22, wherein the inner radius r3 of the cylindrical engagement wall is in the range of 1.5 mm to 20 mm.

24. Microgenerator comprising a stator and a rotor wheel and an actuating system for rotating the rotor wheel, preferably a microgenerator according to one of the clauses 1-9, wherein the actuating system is provided with a clutch system according to one of the clauses 10-23, which clutch system establishes a unidirectional driving engagement of the actuating system with the rotor wheel.

25. Stand-alone electric device provided with at least one integrated microgenerator according to one of the clauses 1-9 or clause 24, wherein a driving element, such as an external driving element and/or further driving element, is movably arranged on the electric device such that the external driving element is movable with respect to the microgenerator, and wherein the external driving element is drivingly connected to the input mechanism of the microgenerator.

26. Stand-alone electric device according to clause 25, which is a key, and/or a lock, in particular a cylinder lock, and/or a hinge, and/or a sensor.

BRIEF DESCRIPTION OF THE DRAWINGS

The invention will be further exemplified by the appended drawings, showing several preferred embodiments of the invention wherein.

DESCRIPTION OF THE INVENTION

Figure 1:
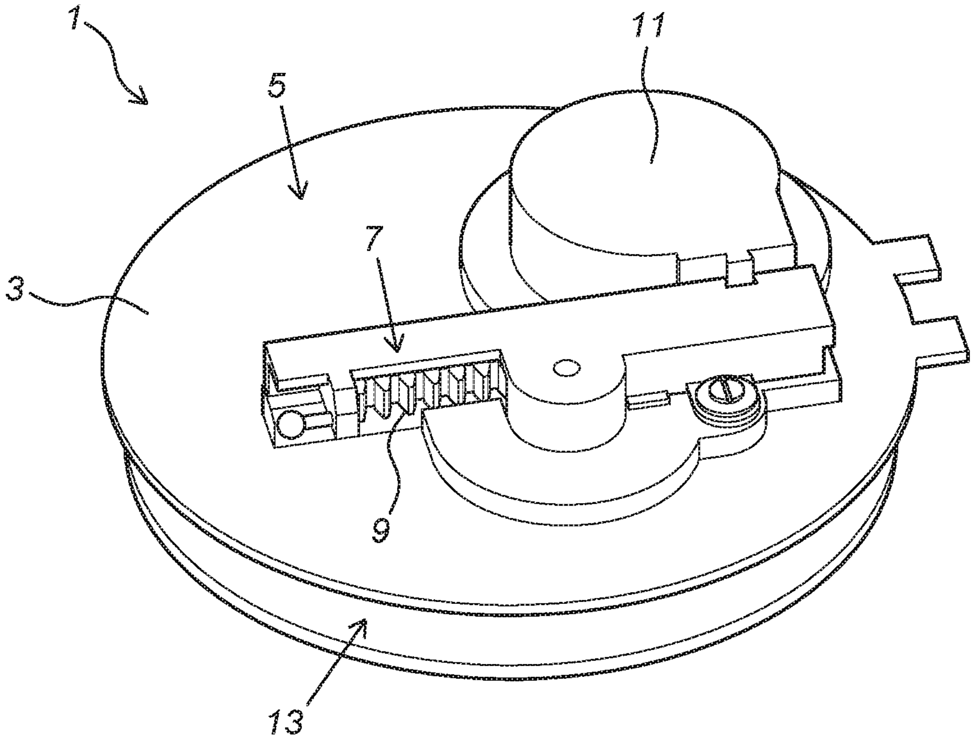
FIG. 1 is a perspective view of a preferred embodiment of a microgenerator according to the invention.

FIG. 1 shows a microgenerator 1, having an overall design of a flat disc, which comprises a base plate 3 or alternative base body having an external or top side 5 and an opposed internal or bottom side. A movable input mechanism 7 is arranged on the top side 5, and comprises an assembly of a linear movable gear 9 (or track gear) which co-operates with a non-visible gear wheel which form part of an actuating system for the microgenerator. When the input mechanism 7 is subjected to an external force that moves the linear gear 9, kinetic energy is introduced into the microgenerator via the actuating system of the microgenerator.

A housing 11 is provided for a counter-actuator for the actuating system. At the bottom side of the base plate 3, the outer circumference of a rotor wheel 13 of the microgenerator is visible.

Figure 2:
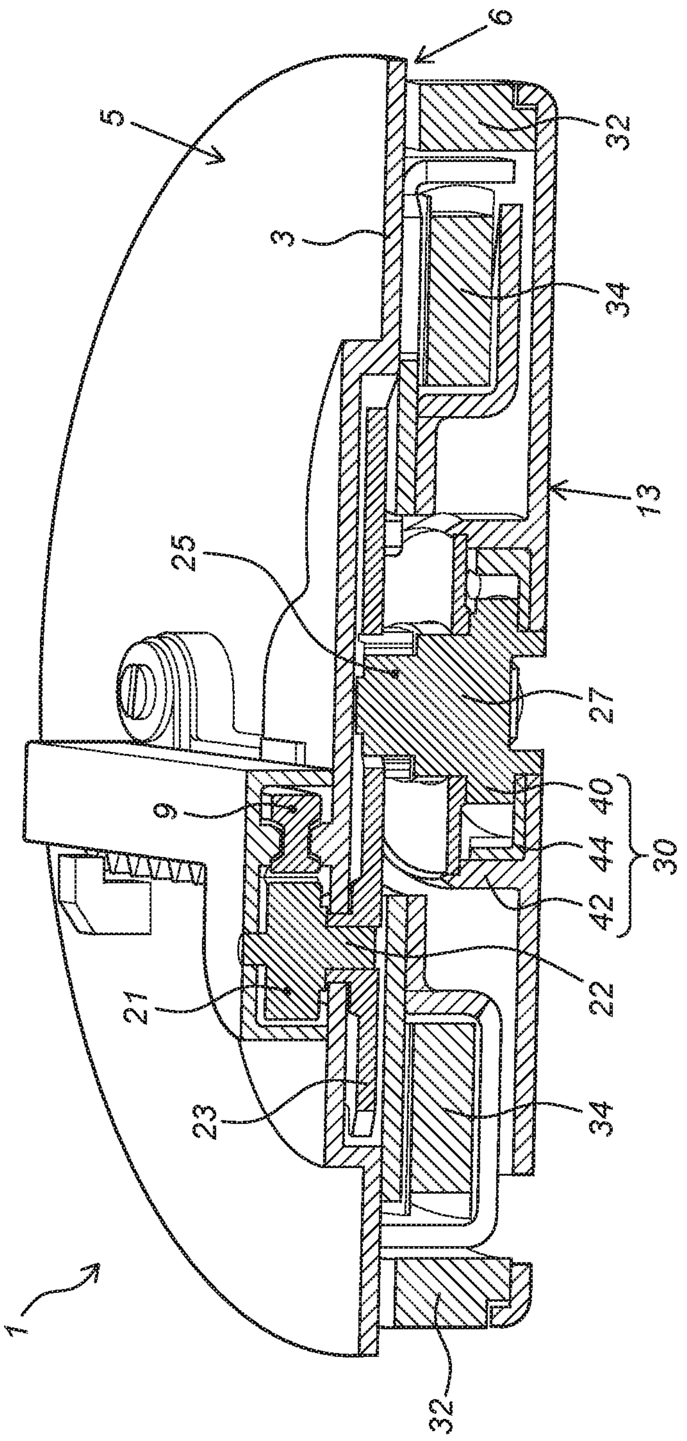
FIG. 2 is a vertical cross-section of the embodiment of FIG. 1.

FIG. 2 shows a vertical cross-section of the embodiment of FIG. 1, wherein identical parts are indicated with the same reference numbers. The linear movable gear 9 co-operates with a gear wheel 21, which drives a first side of a rotatable driving shaft 22. At the internal side 6 of base plate 3, the driving shaft 22 is connected to a driving gear wheel 23 with a concentric orientation to the driving shaft 22. The driving gear wheel 23 drivingly engages with a rotor gear wheel 25 of a rotor shaft 27. The rotor shaft 27 is drivingly connected to the rotor wheel 13 via a clutch system 30 to establish a unidirectional driving engagement of the rotor shaft 27 with the rotor wheel 13.

The clutch system 30 is an assembly of: an outer cylindrical surface 40 of the rotor shaft 27 which surface is provided with a radially undulated profile; a cylindrical engagement wall 42 which is fixedly connected to the rotor wheel 13; and a rotatable and annular clutch body 44 positioned concentrically between the outer cylindrical surface 40 and the cylindrical engagement wall 42, which clutch body is in its rotational direction slidably arranged with respect to both the rotor shaft 27 and the cylindrical engagement wall 42.

The rotor wheel 13 comprises a circular multipole magnetic array 32, and is rotatably positioned on the internal side 6 of the base plate. A stator 34 which is a circular multipole metal stator coil for producing an electric voltage, is fixedly positioned on the internal side 6 of the base plate.

Figure 3A:
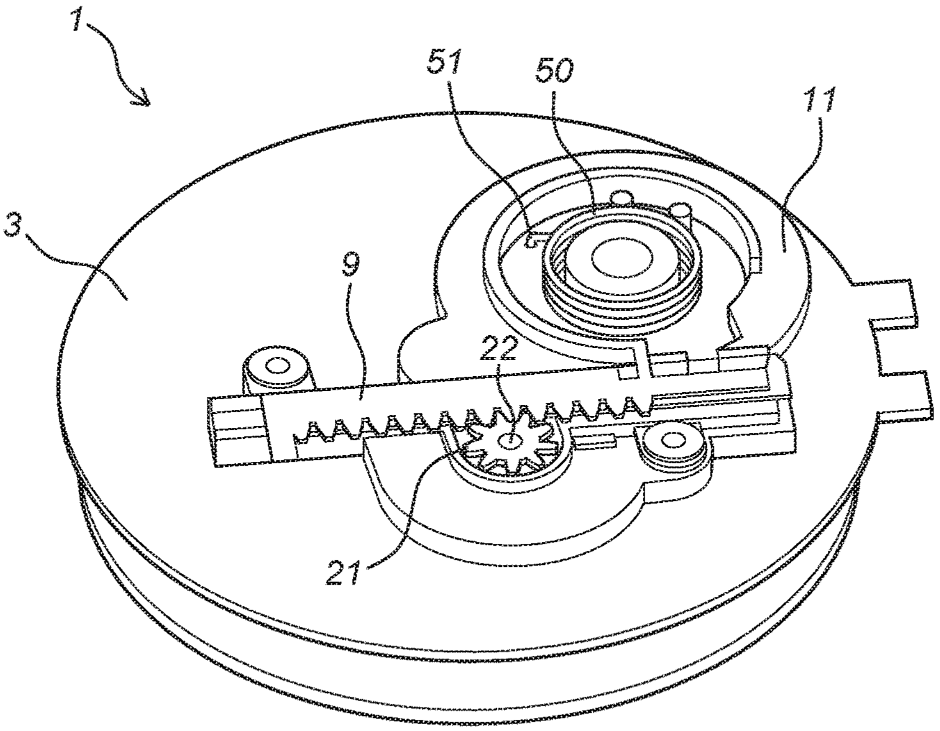
FIGS. 3A and 3B are two different horizontal cross-sections of the embodiment of FIG. 1.
Figure 3B:
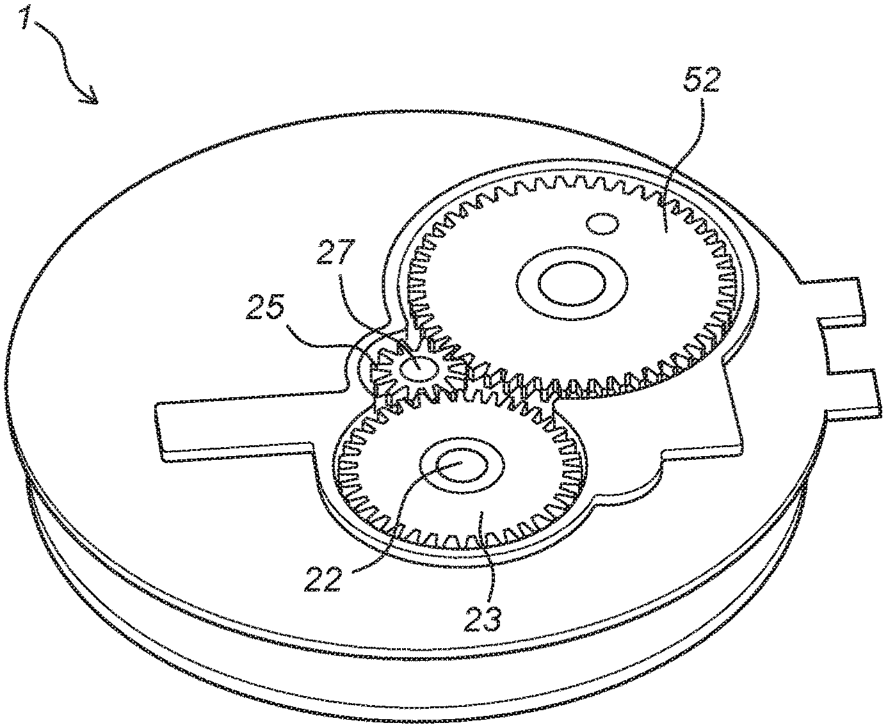

FIGS. 3A and 3B show two horizontal cross-sections at two opposed heights of the base plate 3 of the embodiment of FIG. 1, wherein identical parts are indicated with the same reference numbers.

In FIG. 3A, the linear movable gear 9 co-operating with a gear wheel 21 connected to driving shaft 22 is shown. In the housing 11, a tension coil 50 is arranged of which one end 51 is fixedly connected to the base plate 3, while the other end is fixedly connected to an additional gear wheel (not visible). The tension coil 50 and housing 11 form an optional feature of the invention, which may be dispensed with. As an alternative to the tension coil, a linear spring may be envisaged.

In FIG. 3B, the driving shaft 22 connected to the driving gear wheel 23 is shown, which drivingly engages with a rotor gear wheel 25 of a rotor shaft 27. Furthermore, and as an optional feature of the invention, the gear wheel 25 engages with the additional gear wheel 52, which is spring-loaded by the tension coil 50 shown in FIG. 3A. When the gear track is moved from a default position in order to generate electric energy, the tension coil 50 is wound up. The tension coil 50 functions in the microgenerator thus as a counter-actuator which drives the input mechanism 7, i.e. the gear track 9 back into the default position after kinetic energy has been harvested for producing electric energy.

Figure 4:
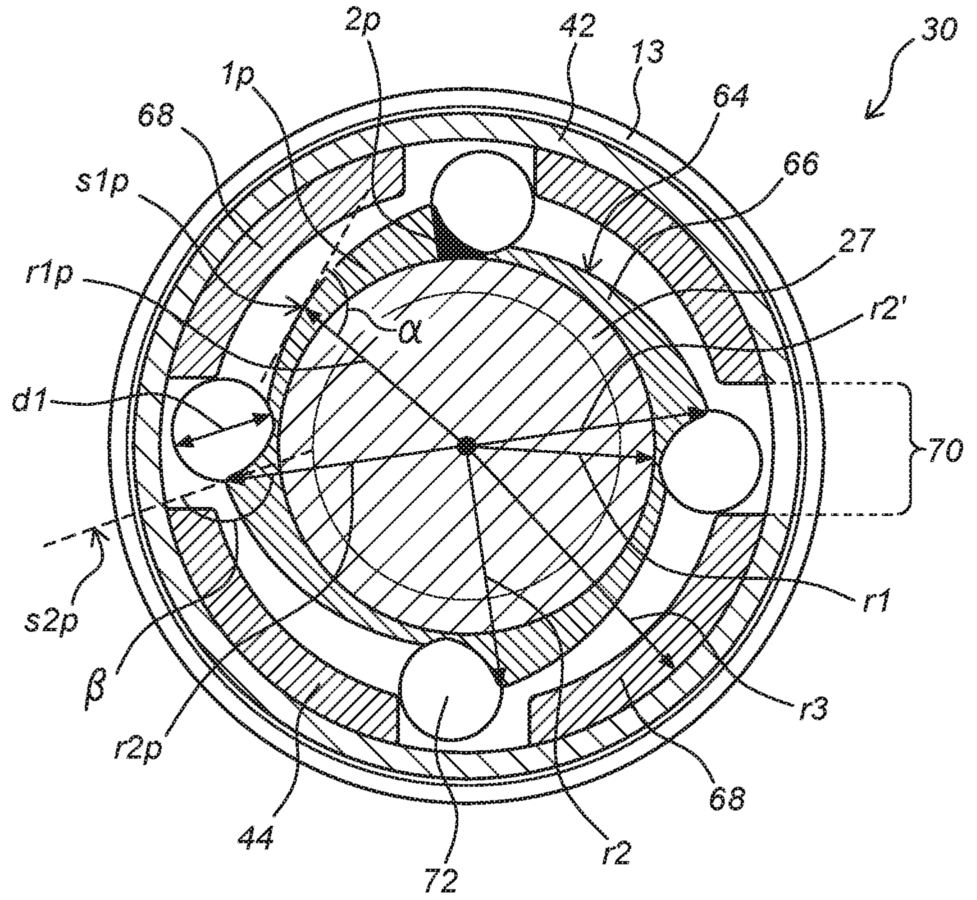
FIG. 4 shows a top view of a clutch system according to a preferred embodiment of the invention.

FIG. 4 shows a clutch system 30, that is suitable to be applied as a clutch system in a microgenerator according to the invention. The clutch system is suitable to be integrated in the actuating system of the microgenerator, such as in a rotor shaft (as exemplified in FIG. 2), or in a driving shaft. Corresponding parts of the clutch system 30 according to FIG. 2, are indicated by the same reference numbers.

The clutch system 30 is an assembly of the following co-operating parts:

- a rotatable shaft 27 having an outer cylindrical surface 64 which is provided with a radially undulated profile 66, so that the radius of the outer cylindrical surface 64 varies between a minimum radius r1 and a maximum radius r2;
- a rotatable cylindrical engagement wall 42 which is fixedly connected to a rotatable part that 13 that is to be driven by the shaft 27, which cylindrical engagement wall 42 has a concentric orientation to the shaft and a substantially constant inner radius r3 that is larger than r2, and surrounds the shaft 27 in a non-contacting manner;
- a rotatable and annular clutch body 44 positioned concentrically between the outer cylindrical surface 64 of the shaft and the cylindrical engagement wall 42, which clutch body 44 is in its rotational direction slidably arranged with respect to both the shaft 27 and the cylindrical engagement wall 42.

The annular clutch body 44 has a cylindrical form comprising four wall segments 68, and four slot segments 70. In each slot segment 70 a clutch ball 72 is present which clutch ball is freely movable within the respective slot segment such that at least a part of the clutch ball is kept within the respective slot segment.

The outer circumference of the clutch body formed by the radial outside surfaces of the wall segments 68 has an outer radius which is smaller than the inner diameter r3 of the engagement wall 42. Consequently a radial outer gap exists between the segments 68 and the engagement wall 42, which gap may be 0.05 mm up to 0.5 mm.

The opposed inner circumference of the clutch body formed by the radial inside surfaces of the wall segments 68 has an inner radius which is larger than the maximum radius r2 of the shaft 27. The inner circumference of the wall segments is distanced from the shaft 27 by a radial outer gap which is at least 0.1 mm up to 1.0 mm.

Furthermore, the radial difference between the outer radius and r3 is smaller than the radial difference between the inner radius and r2, preferably smaller by at least 0.05 mm, and more preferably smaller by 0.1 mm up to 0.5 mm, and most preferably by at least 1.0. mm. As such, a minimal friction may occur between the wall segment 68 and the engagement wall 42, while no friction is possible between the wall segment 68 and the cylindrical surface 64.

Each clutch ball has a diameter d1 which is larger than the difference between r2 and r3 and smaller than the difference between r1 and r3, and the radial thickness of the wall segments 68 is smaller than the difference between r2 and r3.

The undulated profile 66 of the shaft 27, is composed of four adjacent undulation segments, wherein each undulation segment is defined as a segment that stretches from one maximum radius r2 (indicated by the arrow pointing vertically downwards) to an adjacent maximum radius r2' (indicated by the arrow pointing horizontally to the right) and includes one minimum radius r1 in between. The undulation segment as indicated between r2 and r2' comprises a first undulation profile, stretching from the maximum radius r2 to the minimum radius r1 and a second undulation profile stretching from the minimum radius r1 to the adjacent maximum radius r2'. For clarity, one of the second undulation profiles is shown in FIG. 4 as a coloured (i.e. blackened) section 2*p*, to distinguish it from a neighbouring first undulation profile 1*p*.

The clutch system is designed to establish a unidirectional driving engagement of the shaft 27 with the cylindrical engagement wall 42, based on the following:

The situation shown in FIG. 4 is adopted when the shaft 27 is rotated in a clockwise direction, wherein the clutch ball 72 is resting against a second undulation profile 2*p* which has a circular profile that approximates the radius of the clutch ball 72. The clutch ball 72 is herein kept in the idle position, wherein no driving engagement is established between the shaft and the cylindrical engagement wall. The clutch ball 72 is merely contacting the shaft 27 and a wall segment 68, without contacting the engagement wall 42. As the wall segment 68 is part of the slidably arranged clutch body 44, the clutch body will be rotated by the shaft 27, whereas the engagement wall 42 is not rotated.

Conversely, when the shaft 27 is rotated in an anti-clockwise direction, the clutch ball 72 will be guided by the wall segments 68 over first undulation profile 1*p* from the shown position at the minimum radius r1, towards the maximum radius r2, until at an intermediate radius the clutch ball 72 is clamped in an abutting contact between the undulation profile 1*p* and the cylindrical engagement wall 42, which is defined as the active position of the clutch ball. In this active position the clutch ball 72 establishes a driving engagement between the shaft 27 and the cylindrical engagement wall 42.

The tangential lines s1*p* and s2*p* serve to indicate the maximum sloping angle of the first and second undulation profile 1*p* and 2*p* at the indicated two positions on the profile. The maximum sloping angles of the two profiles are defined as the respective angles α and β, between the two tangential lines s1*p* and s2*p* and the respective radial lines rip and r2*p*. The angle α and β are about 105 degrees and about 150 degrees respectively.

The functioning of the clutch system profits from the inertia of the slidably arranged clutch body 44 when changing the direction of rotation of the shaft 27 (or when the rotation is stopped and the shaft is stationary): the active position of the clutch ball is established when rotating the shaft 27 in anti-clockwise rotation and the microgenerator transforms the kinetic energy into electric energy. Once this rotation is halted or reversed when the single movement is completed, the slidably arranged clutch body 44 will immediately knock the clutch balls 72 free from their clamped position, so that the clutch balls will be moved into an idle position, while the inertia of the rotor wheel 13 secures that electric energy is generated for a prolonged time.

It is furthermore found that the above beneficial effect of the clutch body 44 is further enhanced by the dimensioning of the wall segments, wherein a minimal friction may occur between the wall segment 68 and the engagement wall 42, while no friction is possible between the wall segment 68 and the cylindrical surface 64.

Figure 5:
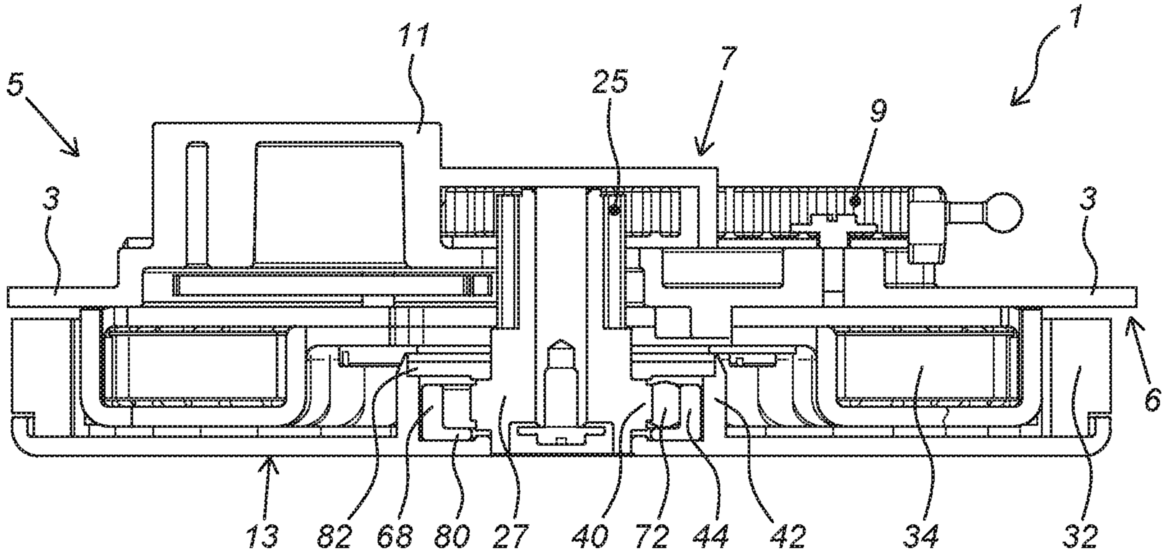
FIG. 5 is a perspective view of an alternative preferred embodiment of a microgenerator according to the invention.

FIG. 5 is a cross-sectional view of a preferred embodiment of a microgenerator 1 which is an alternative embodiment of a microgenerator as shown in FIGS. 1 and 2. The microgenerator 1 contains the same clutch system as shown in FIGS. 2 and 4. Parts of the microgenerator shown in FIG. 5 that are identical to the parts shown in FIGS. 1, 2 and 4 are indicated with the same reference numbers.

The microgenerator 1 has an overall comparable design of a flat disc as shown in FIG. 1, and comprises a base plate 3 having an external or top side 5 and an opposed internal or bottom side 6. A movable input mechanism 7 is arranged on the top side 5, in the form of a linear movable gear 9 (or track gear) which co-operates directly with a rotor gear wheel 25 of a rotor shaft 27. The rotor shaft 27 is drivingly connected to the rotor wheel 13 via a clutch system to establish a unidirectional driving engagement of the rotor shaft 27 with the rotor wheel 13. As such, the microgenerator 1 is devoid of any additional transmission gears for driving the rotor wheel 13, which design allows for a most compact embodiment of the microgenerator.

The clutch system is an assembly of: an outer cylindrical surface 40 of the rotor shaft 27 which surface is provided with a radially undulated profile; a cylindrical engagement wall 42 which is fixedly connected to the rotor wheel 13; and a rotatable and annular clutch body 44 positioned concentrically between the outer cylindrical surface 40 and the cylindrical engagement wall 42, which clutch body is in its rotational direction slidably arranged with respect to both the rotor shaft 27 and the cylindrical engagement wall 42.

The clutch body 44 includes vertically oriented wall segments 68 which are connected onto a flattened ring 80 which is horizontally oriented. The ring 80 forms an annular bottom structure for the clutch body 44 which is slidably arranged between the rotor wheel 13 and the rotor shaft 27. A ceiling structure 82 to the clutch body is an opposed flattened ring 82 which is fixedly connected to the engagement wall 42 and is frictionlessly arranged with regard to the clutch body 44 and the rotor shaft 27. One clutch ball 72 is shown which is present in a slot segment that is present between two adjacent wall segments 68.

It will be apparent that the invention is not limited to the exemplary embodiments shown and described here, but that within the scope of the appended claims numerous variants are possible which will be self-evident to the skilled person in this field. It is possible here to envisage that different inventive concepts and/or technical measures of the above described embodiment variants can be wholly or partially combined without departing from the inventive concept described in the appended claims. The verb “comprise” and conjugations thereof used in this patent publication are understood to mean not only “comprise”, but are also understood to mean the phrases “contain”, “substantially consist of”, “formed by” and conjugations thereof.

The invention claimed is:

1. A microgenerator comprising:

a base body;

a stator which is a circular multipole metal stator coil for producing an electric voltage, which stator is fixedly positioned on the base body;

a rotor wheel comprising a circular multipole magnetic array, which rotor wheel is rotatably positioned on the base body;

an actuating system for rotating the rotor wheel, which actuating system comprises:

an input mechanism provided on the base body, which input mechanism is preferably movable in two directions, and a rotatable rotor shaft which has a concentric orientation to the rotor wheel, the rotor shaft being drivingly engaged with the input mechanism either in a direct or indirect manner, wherein a first side of the rotor shaft is provided with a rotor gear wheel that is in driving engagement with the input mechanism either in a direct or indirect manner, and a second side of the rotor shaft is drivingly connected to the rotor wheel, wherein the actuating system is provided with at least one clutch system to establish a unidirectional driving engagement of the actuating system with the rotor wheel, wherein the clutch system is configured such that:

a) when the input mechanism is moved in a first direction, the clutch system adopts a driving engagement status and the rotor wheel is rotated, and b) when the input mechanism is moved in a second direction or is in a stationary position, the clutch system adopts an idle status and no driving engagement is established between the input mechanism and the rotor wheel;

wherein the clutch system comprises an assembly of:

a rotatable shaft which is part of the actuating system, which shaft has an outer cylindrical surface which is provided with a radially undulated profile so that the radius of the outer cylindrical surface varies between a minimum radius r1 and a maximum radius r2, a rotatable cylindrical engagement wall which is fixedly connected to a rotatable part that is to be driven by the shaft, which cylindrical engagement wall has a concentric orientation to the shaft and an substantially constant inner radius r3 that is larger than r2, and surrounds the shaft in a non-contacting manner, a rotatable and annular clutch body positioned concentrically between the outer cylindrical surface of the shaft and the cylindrical engagement wall, which clutch body is in its rotational direction slidably arranged with respect to both the shaft and the cylindrical engagement wall, wherein the annular clutch body has a cylindrical form comprising at least one slot segment delimited by at least one wall segment, and preferably comprising at least four segments which include at least two wall segments and at least two slot segments such that each slot segment is delimited by two wall segments, wherein in each slot segment a clutch ball is present which clutch ball is freely movable within the respective slot segment such that at least a part of the clutch ball is kept within the respective slot segment, wherein each clutch ball has a diameter d1 which is larger than the difference between r2 and r3 and smaller than the difference between r1 and r3, and the radial thickness of the wall segments is smaller than the difference between r2 and r3, wherein the clutch system is designed to establish a unidirectional driving engagement of the shaft with the cylindrical engagement wall, such that:

a) when the shaft is rotated in a first rotational direction, the clutch system adopts a driving engagement status such that the cylindrical engagement wall is driven by the shaft, and b) when the shaft is rotated in a second rotational direction, the clutch system adopts an idle status wherein no driving engagement is established between the shaft and the cylindrical engagement wall, wherein the clutch body allows for a freedom of radial movement of each clutch ball within the respective slot segment, such that each clutch ball is moved to an active position when the shaft is rotated in the first rotational direction, and each clutch ball is moved to an idle position when the shaft is rotated in a second rotational direction.

2. The microgenerator according to claim 1, wherein the rotor shaft is drivingly engaged with the input mechanism in an indirect manner by virtue of at least one rotatable driving shaft that is included in the actuating system and positioned between the input mechanism and the rotor shaft, wherein a first side of the driving shaft is drivingly connected in a direct or indirect manner to the input mechanism, and a second side of the driving shaft is provided with a driving gear wheel that has a concentric orientation to the driving shaft, which driving gear wheel is drivingly engaged with the rotor gear wheel in a direct or indirect manner, wherein preferably the clutch system is integrated in the driving shaft, such that the clutch system in driving engagement status establishes a driving engagement between the driving shaft and the driving gear wheel, while in idle status no driving engagement is established between the driving shaft and the driving gear wheel.

3. The microgenerator according to claim 1, wherein the clutch system is integrated in the rotor shaft, such that the clutch system in driving engagement status establishes a driving engagement between the rotor shaft and the rotor wheel, while in idle status no driving engagement is established between the rotor shaft and the rotor wheel, and wherein preferably the clutch system is arranged in a same plane wherein the stator and the rotor wheel are arranged.

4. The microgenerator according to claim 1, wherein the stator and the rotor wheel are concentrically positioned on the base body, in such a way that the diameter of the rotor wheel is larger than the diameter of the stator, so that the rotor wheel surrounds the stator; or the diameter of the stator is larger than the diameter of the rotor wheel, so that the stator surrounds the rotor wheel.

5. The microgenerator according to claim 1, wherein the input mechanism comprises a rotatable wheel such as a gear wheel that is drivingly engaging with the rotor shaft in a direct or indirect manner, and preferably the input mechanism comprises a co-operating assembly of a gear wheel and a linear movable gear, wherein the linear movable gear rotates the gear wheel which is drivingly engaging with the rotor shaft in a direct or indirect manner.

6. The microgenerator according to claim 1, which is provided with a counter-actuator which drives the input mechanism into a predetermined default position of the input mechanism, preferably the counter-actuator being a spring, such as a linear compression spring or a torsion spring.

7. The microgenerator according to claim 1, wherein the actuating system is provided with a kinetic energy absorbing means which absorbs, up to a threshold value, kinetic energy that is introduced into the actuating system via the input mechanism, and which kinetic energy absorbing means releases the absorbed kinetic energy to the actuating system for rotation of the rotor wheel when the threshold value is exceeded.

8. The microgenerator according to claim 1, wherein the rotor wheel is rotated by the input mechanism when the input mechanism is subjected to an external force that moves the input mechanism from a predetermined default position towards a next position along a single trajectory.

9. The microgenerator according to claim 1, wherein the stator and rotor wheel form an assembly which has a maximum outer diameter of about 10.0-40.0 mm, preferably 10.0-30.0 mm, and wherein preferably the overall thickness of the microgenerator is about 2.0 mm-20.0 mm, preferably 2.0-10.0 mm.

10. The microgenerator according to claim 1, wherein the base body is a base plate having an internal and external side, wherein the rotor wheel and stator are provided on the internal side and the input mechanism is provided on the external side.

11. The microgenerator according to claim 1, wherein the clutch system is configured in such a way that the clutch body has an outer circumference formed by the radial outside surfaces of the wall segments which outer circumference has an outer radius which is smaller than r3, and an opposed inner circumference formed by the radial inside surfaces of the wall segments which inner circumference has an inner radius which is larger than r2, wherein the radial difference between the outer radius and r3 is smaller than the radial difference between the inner radius and r2, preferably smaller by at least 0.05 mm, and more preferably smaller by 0.1 mm up to 0.5 mm, and most preferably by at least 1.0 mm.

12. The microgenerator according to claim 1, wherein the clutch system is configured in such a way that the inner radius r3 of the cylindrical engagement wall is in the range of 1.0 mm to 30 mm, preferably 1.0 mm to 10 mm, more preferably 1.0 mm to 5 mm.

13. The microgenerator according to claim 1, wherein the clutch system is configured in such a way that:

the minimum radius r1 lies in the range of 0.25-20 mm, preferably 0.25-10 mm and more preferably 0.25-5.0 mm; and/or the maximum radius r2 lies in the range of 0.50-25 mm, preferably 0.50-10 mm and more preferably 0.50-5.0 mm.

14. The microgenerator according to claim 1, wherein the clutch system is configured in such a way that the diameter d1 of the clutch balls lies in the range of 0.25-7.5 mm, preferably 0.25-2.5 mm and more preferably 0.15-1.0 mm.

15. A stand-alone electric device provided with at least one integrated microgenerator according to claim 1, wherein an external driving element and/or further driving element is movably arranged on the electric device such that the external driving element is movable with respect to the microgenerator, and wherein the external driving element is drivingly connected to the input mechanism of the microgenerator, preferably the device being a key and/or a lock, in particular a cylindrical lock, more preferably a hinge, or a sensor or a remote control.

* * * * *